3,344,882
RETRACTABLE SILENCERS AND THRUST
REVERSERS FOR JET ENGINES
Jean-Claude Bellion, Paris, and René Gérard Hoch, Dammarie-les-Lys, France, assignors to Societe Nationale d'Etude et de Construction de Moteurs d'Aviation, Paris, France, a company of France
Filed June 3, 1965, Ser. No. 461,008
Claims priority, application France, June 8, 1964, 977,483
4 Claims. (Cl. 181—51)

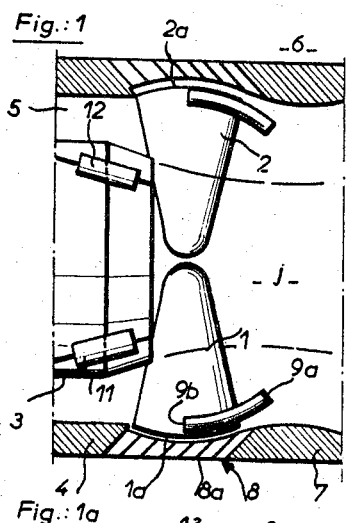
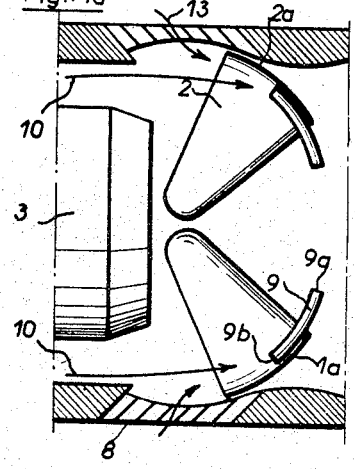
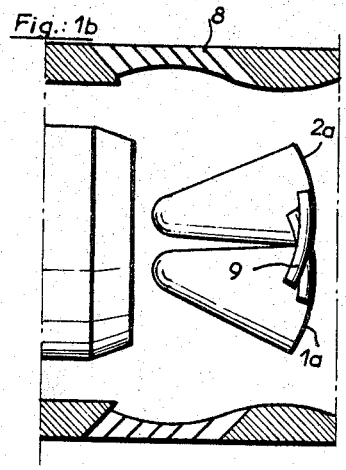
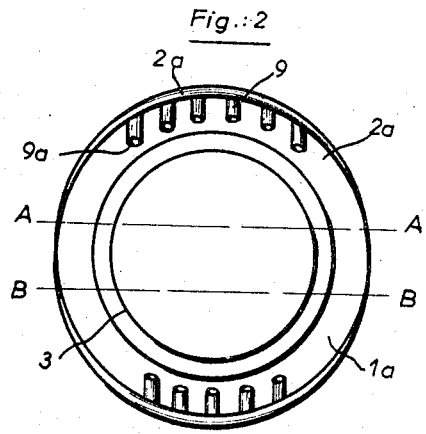
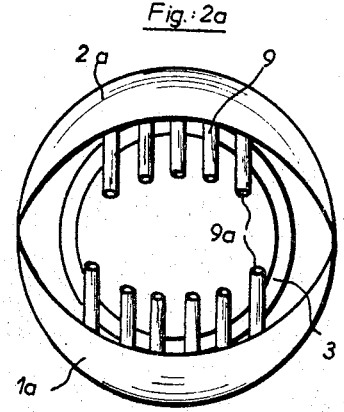
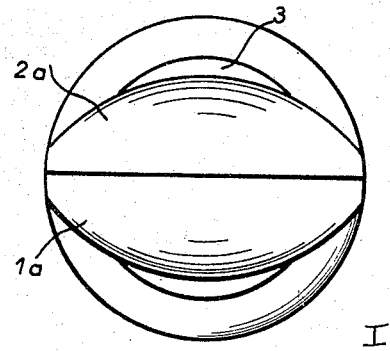
Inventors
Jean-Claude Bellion
René Gérard Hoch
Attorneys Oct. 3, 1967    JEAN-CLAUDE BELLION ETAL    3,344,882
RETRACTABLE SILENCERS AND THRUST REVERSERS FOR JET ENGINES
Filed June 3, 1965                                   2 Sheets-Sheet 2
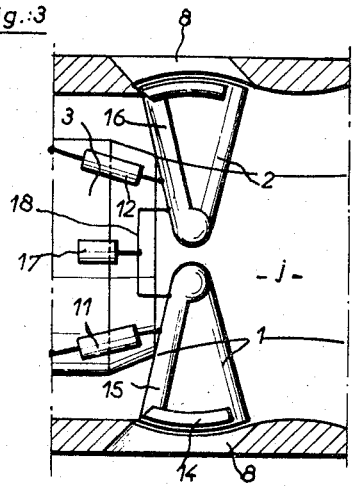
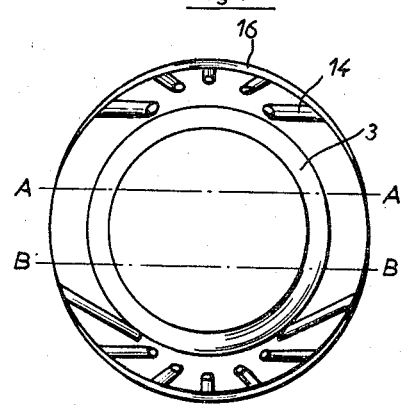
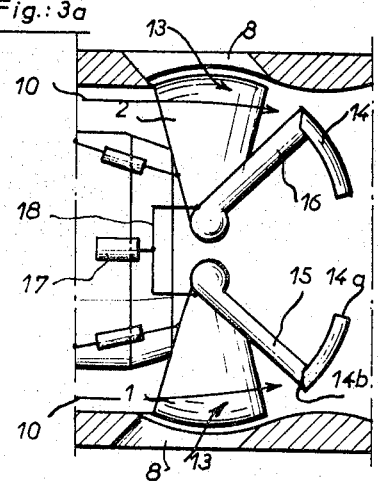
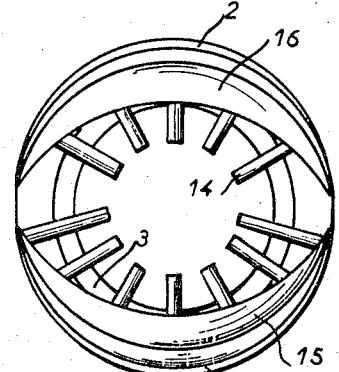
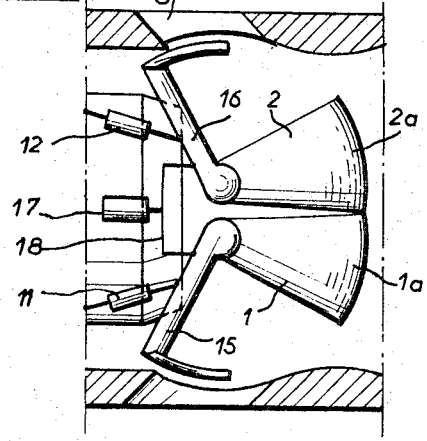
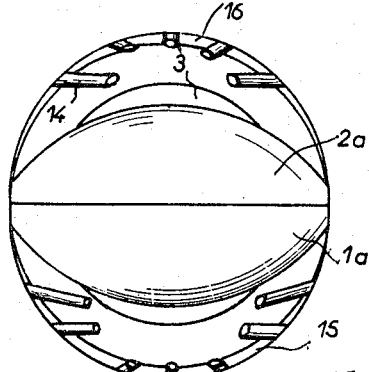
Inventors
Jean-Claude Bellion
René Gérard Hoch
Stevens, Davis, Miller & Mosher
Attorneys

United States Patent Office 3,344,882
Patented Oct. 3, 1967

The invention relates to devices known as "silencers" which enable the noise of aircraft jet engines and more generally that of supersonic jet aircraft to be reduced by introducing air into the jet, to the rear of the nozzle.

It is already known to use fixed-geometry silencers mounted in extension of a fixed nozzle, and variable-geometry silencers in which the propulsion nozzle and the silencer generally form a single unit, with the silencer elements providing adjustment of the primary ejection cross-section. It is presently known how to construct such silencers, which cause only acceptable losses in propulsion.

However, plans for supersonic transport aircraft now under study provide for the addition, behind the primary nozzle, of a divergent portion of element permitting adaptation of the ejection system for supersonic flight. Now, generally speaking, the presence of a silencer on the primary nozzle is the root cause of a deterioration in the performance of an ejection system comprising a divergent portion, in particular when flying at speeds for which the assembly is not suited. These losses derive essentially from the fact that the primary flow clings to the divergent portion, this clinging being assisted by the presence of the silencer. To these losses there are added losses through mixing.

It is therefore extremely advantageous to provide a retractable silencer, that is to say a silencer retracting completely outside the jet in the inoperative position, which enables these supplementary losses caused by any non-retractable silencer to be obviated. In fact, contrary to what is the case with silencers having fixed or variable geometry, a retractable silencer is used only during those stages of flight which are the cause of a serious discomfort to people on the ground, namely take-off and initial climb on the one hand and flight when approaching an airfield on the other hand.

In patent application Ser. No. 386,194, filed by Joseph Bartek et al., now Patent No. 3,263,931, is described a device in which the silencer effect is obtained by means of tubes of circular or profiled cross-section, the upstream ends of which open into the vicinity of the external periphery of the nozzle and are subjected to the ambient pressure prevailing thereat, and the downstream ends of which open into the jet at the rear of the nozzle and externally thereof, means being provided for retracting said tubes at will in order to reduce or clear the space occupied by them in the nozzle and/or in the jet.

The invention relates to improvements to retractable silencers of this type in which the tubes retract fully from the jet.

To this end, in form of embodiment of a retractable silencer, the tube elements constituting the retractable silencer are fixed on a device articulated on a diametral axis, that is to say an axis at right angles to the axis of the nozzle, or on a substantially diametral axis, so that in the operative position the downstream ends of the tubes open into the jet at the rear of the nozzle and the tubes are retracted outside the jet in the inoperative position. This improvement is applicable in particular to jet engines equipped with a jet reverser constituted by two jaws articulated on a diametral axis or on two substantially diametral axes. In one construction the tubes are fixed to these jaws themselves; in another construction they are fixed to supports independently of the jaws of the jet reverser.

The description which follows of two possible forms of embodiment of the invention, given with reference to the accompanying non-limitative exemplary drawings, will enable the various features of the invention and the manner of carrying them into practice to be clearly understood.

In the drawings,

FIGURE 1 shows a retractable silencer, the tubes of which are fixed to the jaws of a jet reverser, the silencer being shown in diagrammatic axial section in the inoperative position;

FIGURE 2 is an end view from the right of FIGURE 1, the divergent portion being assumed to be removed;

FIGURES 1a and 2a are views similar to FIGURES 1 and 2, respectively, showing the arrangement with the silencer in its operative position;

FIGURES 1b and 2b are views similar to FIGURES 1 and 2 showing the arrangement in the jet reversing position;

FIGURE 3 is a view similar to FIGURE 1 showing a modified constructional form in which the tubes of the silencer are fixed to supports which are independent of the jaws of the reverser;

FIGURE 4 is an end view from the right of FIGURE 3, the divergent portion being assumed to be removed;

FIGURES 3a and 4a are views similar to FIGURES 3 and 4, respectively, showing the silencer in the operative position;

FIGURES 3b and 4b are views similar to FIGURES 3 and 4, respectively, showing the arrangement in the jet reversing position.

The jet engine shown in FIGURES 1 and 2 comprises in known manner a thrust reverser constituted by two jaws 1 and 2 articulated respectively on parallel axes A—A and B—B behind the nozzle 3 and controlled by jacks shown diagrammatically at 11 and 12 in FIGURE 1. A jet reverser of this kind is known and used in many jet engines; it is therefore unnecessary to describe this in detail.

The nozzle 3 is surrounded by a casing 4 defining an annular duct 5 serving for the passage of the secondary air of the jet engine, the tertiary air flowing through the space 6 outside this casing. This tertiary air passes into the interior of the divergent portion 7 through one or more circular orifices 8 equipped with inclined vanes 8a.

The silencer is constituted by a number of tube elements 9 which are curved in the form of circular arcs and are each fixed to the inside of the peripheral surface 1a or 2a of one of the jaws 1 or 2 in such manner that the downstream end 9a of the tube projects substantially opposite the said jaw and the upstream end 9b thereof is located opposite the central portion of the said peripheral surface 1a or 2a.

It will be seen that in the inoperative position shown in FIGURES 1 and 2 the peripheral surfaces 1a and 2a of the jaws and the tubes 9 are completely retracted outside the jet j emitted by the nozzle 3. This is the arrangement employed in cruising flight.

FIGURES 1a and 2a show the arrangement in the operative position of the silencer, the peripheral surfaces 1a and 2a of the jaws being still located outside the jet j, while the ends 9a of the tubes 9 are located in the jet. The upstream ends 9b of the tubes receive, on the one hand, the secondary air represented diagrammatically by the arrows 10 and coming from the annular duct 5 and, on the other hand, tertiary air represented diagrammatically by the arrows 13 and passing through the annular orifices 8.

In the position shown in FIGURE 1b, the peripheral surfaces 1a and 2a meet and ensure the reversal of the jet in known manner. In this position, the tubes 9 are completely masked behind these surfaces 1a and 2a.

In this embodiment the tubes 9 are fast with the jaws 1, 2 and rock with them, under the action of the jacks 11 and 12, between the retracted position shown in FIGURES 1 and 2, the position shown in FIGURES 1a and 2a in which the silencer is operative and the jet reversing position of FIGURES 1b and 2b. The arrangement therefore has the advantage of relative lightness since the only additional weight which is added when the silencer device is fitted to a jet engine equipped with a jet deflector is the weight of the tubes 9 which effect the reduction of noise.

In the modification shown in FIGURES 3 and 4, the tubes 14 are similar to the tubes 9 shown in FIGURES 1 and 2. However, they are not fixed to the jaws 1 and 2 themselves, but to two supports 15 and 16 which conform to the shape of the said jaws and are articulated on the same axes A—A and B—B, respectively. In addition to the jacks 11 and 12 which effect rocking of the jaws 1 and 2 as in the preceding figures, other jacks are provided, such as that which is shown diagrammatically at 17, these jacks simultaneously ensuring the rocking of the supports 15 and 16 through the medium of a linkage 18.

In the position shown in FIGURES 3 and 4, the silencer and the jet reverser are in the inoperative position, being located against the orifices 8 and thus being retracted outside the jet j. In FIGURES 3a and 4a, the supports 15 and 16 have been rocked inwardly by means of the jacks 17, so that the downstream ends 14a of the tubes 14 are located in the jet j, their upstream ends 14b receiving the secondary air 10 and tertiary air 13, as in the case of the preceding figures. The jaws 1 and 2 remain retracted.

In FIGURES 3b and 4b, the supports 15 and 16 have been brought back into their retracted positions opposite the orifices 8 and the jet reversers 1 and 2 have been brought into the reversing position.

It is obvious that the control of the jaws 1 and 2 may be independent of that of the supports 15 and 16, the jacks 17 being actuated independently of the jacks 11 and 12, or else the control of the supports 15 and 16 may be coupled with that of the jaws 1 and 2.

The manner of operation of the silencer device in its operative position, when the downstream ends of the tubes open into the jet, as shown in FIGURES 1a and 3a, is the same as in the above-cited patent application filed by Joseph Bartek et al., the air being drawn in by induction at the upstream ends of the tubes and discharged into the jet at their downstream ends.

What is claimed is:

1. A device for reducing the jet noise emitted by the nozzle of a jet engine, comprising a plurality of tubes having downstream ends projecting into the jet at the rear of the nozzle and upstream ends opening out adjacent the external periphery of the nozzle, and means for swivelling said tubes about swivel axes substantially perpendicular to the longitudinal axis of the nozzle and located closer to said longitudinal axis than said tubes, whereby to fully retract the latter from the jet.

2. A retractable silencer device for reducing the jet noise emitted by the nozzle of a jet engine, comprising a pair of horizontally opposed supports mounted for pivotal motion in an axial plane of the nozzle, the hinge line of each support passing very close to the longitudinal axis of the nozzle, a plurality of tubes fixed to each support and so directed that in a first position of said supports the downstream ends of the tubes project into the jet downstream of the nozzle and their upstream ends open into the vicinity of the external periphery of the nozzle, and means for swivelling said supports in unison between said first position and a second position in which said tubes are fully retracted from the jet.

3. A device for reversing the jet exhausting from the nozzle of a jet engine and for reducing its noise, comprising a pair of mutually opposed jaw-shaped members mounted for pivotal motion in an axial plane of the nozzle, said jaws having peripheral surfaces which mate in a jet-reversing position for deflecting the jet into the forward direction; a plurality of tubes fixed to the peripheral surface of each jaw with their downstream ends projecting beyond said peripheral surfaces, whereby, in a silencing position of said jaws said downstream ends project into the jet at the rear of the nozzle and said peripheral surfaces are retracted from the jet with the upstream ends of said tubes clear of the jet and directed toward the fore end of the nozzle, and whereby in the jet reversing position the downstream ends of the tubes supported by each jaw are masked by the peripheral surface of the other jaw; and means for swivelling said jaws in unison between said jet reversing position, the silencing position, and an inoperative position wherein said peripheral surfaces and said tubes are retracted from the jet.

4. A device for reversing the jet exhausting from the nozzle of a jet engine and for reducing its noise, comprising a pair of opposed jaw-shaped members mounted for pivotal motion in the direction of an axial plane of the nozzle, said jaws having peripheral surfaces which mate in a jet reversing position for deflecting the jet into the forward direction; a pair of pivotally mounted supports, each being pivoted about substantially the same hinge line as one of said jaws; a plurality of tubes fixed to each support and orientated in such manner that in a silencing position of said supports the downstream ends of said tubes project into the jet at the rear of the nozzle and their upstream ends open into the vicinity of the external periphery of the nozzle; means for swivelling said jaws in unison between said jet reversing position and an inoperative position wherein said peripheral surfaces are retracted from the jet; and means for swivelling said supports in unison between said silencing position and an inoperative position wherein said tubes are fully retracted from the jet and accommodated against said peripheral surfaces.

References Cited

UNITED STATES PATENTS

| 2,997,845 | 8/1961 | Oulianoff | 181—33 |
| 3,027,714 | 4/1962 | Parker | 181—33 |
| 3,263,931 | 8/1966 | Bartek et al. | 181—33 |

OTHER REFERENCES

VEB Entwicklungsbau Pirna, German application 1,100,385, printed Feb. 23, 1961.

RICHARD B. WILKINSON, *Primary Examiner.*

R. S. WARD, *Examiner.*